United States Patent
Subramanian

(10) Patent No.: US 7,706,763 B2
(45) Date of Patent: Apr. 27, 2010

(54) SYSTEM AND METHOD FOR SWITCHING OPERATING MODES OF A MOBILE STATION

(75) Inventor: Parthasarathy Subramanian, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 893 days.

(21) Appl. No.: 11/358,387

(22) Filed: Feb. 21, 2006

(65) Prior Publication Data

US 2007/0197255 A1 Aug. 23, 2007

(51) Int. Cl.
*H04B 1/18* (2006.01)
(52) U.S. Cl. .......... 455/168.1; 455/504; 455/180.1; 455/448; 370/218
(58) Field of Classification Search .......... 455/168.1, 455/504, 180.1, 448, 452.2, 428, 63.3; 370/218, 370/204
See application file for complete search history.

(56) References Cited

U.S. PATENT DOCUMENTS

| | | | |
|---|---|---|---|
| 6,201,791 B1* | 3/2001 | Bournas | 370/234 |
| 6,631,277 B2* | 10/2003 | Berg et al. | 455/562.1 |
| 6,934,270 B2* | 8/2005 | Demetrescu et al. | 370/328 |
| 7,050,824 B2* | 5/2006 | Masseroni et al. | 455/522 |
| 7,068,619 B2* | 6/2006 | Balachandran et al. | 370/328 |
| 7,149,192 B2* | 12/2006 | Kwak | 370/320 |
| 7,181,667 B2* | 2/2007 | Argyropoulos et al. | 714/748 |
| 7,428,422 B2* | 9/2008 | Hannu et al. | 455/518 |
| 7,433,460 B2* | 10/2008 | Budka et al. | 379/332 |
| 2002/0019232 A1* | 2/2002 | Balachandran et al. | 455/445 |
| 2002/0123370 A1* | 9/2002 | Berg et al. | 455/562 |
| 2003/0054850 A1* | 3/2003 | Masseroni et al. | 455/522 |
| 2004/0147262 A1* | 7/2004 | Lescuyer et al. | 455/434 |
| 2005/0064821 A1* | 3/2005 | Hedberg et al. | 455/67.11 |
| 2005/0195828 A1* | 9/2005 | Klein et al. | 370/395.4 |
| 2006/0050812 A1* | 3/2006 | Hietala et al. | 375/308 |
| 2006/0094455 A1* | 5/2006 | Hannu et al. | 455/518 |
| 2006/0146831 A1* | 7/2006 | Argyropoulos et al. | 370/394 |
| 2006/0182057 A1* | 8/2006 | Singvall et al. | 370/329 |
| 2006/0203943 A1* | 9/2006 | Scheim et al. | 375/341 |
| 2006/0291395 A1* | 12/2006 | Ketonen et al. | 370/236 |

* cited by examiner

*Primary Examiner*—Minh D Dao

(57) ABSTRACT

When operating a mobile station in an Enhanced General Packet Radio Service (EGPRS)-compliant mode of operation, a first performance of the mobile station (110) in the EGPRS-compliant mode of operation is evaluated based upon received operating parameters. A second performance of the mobile station (110) in a General Packet Radio Service (GPRS)-compliant mode of operation is also determined based upon the received operating parameters. The EGPRS-compliant mode of the mobile station (110) is switched to the GPRS-compliant mode of operation whenever the second performance is evaluated to be preferable to the first performance.

14 Claims, 2 Drawing Sheets

SYSTEM AND METHOD FOR SWITCHING OPERATING MODES OF A MOBILE STATION

FIELD OF THE INVENTION

The field of the invention relates to wireless communication networks and, more specifically, to operating mobile stations within networks.

BACKGROUND OF THE INVENTION

Various types of networks exist and mobile stations operate in different operating modes within these networks. For example, mobile stations sometimes operate in Enhanced General Packet Radio Service (EGPRS)-compliant, General Packet Radio Service (GPRS)-compliant, and Universal Mobile Telecommunications Service (UMTS)-compliant modes. Some modes have advantages over others under different conditions. For instance, the UMTS mode offers higher bandwidth and throughput than EGPRS and GPRS. The EGPRS mode allows the use of higher coding schemes providing for the more efficient transfer of data when compared to GPRS.

In many modes of operation, data blocks are transmitted through networks, but sometimes have to be retransmitted when the blocks become lost or misplaced. A packet scheduler is used to transmit the data blocks, but this scheduler and the mobile station to which the blocks are ultimately being sent are often separated by several network entities and an air interface. Consequently, a substantial time delay is usually present. The delay necessitates that the packet scheduler send downlink data blocks in advance of the amount of time equal to the downlink propagation delay such that there are almost always downlink data blocks transiting to the mobile station.

Previous approaches have not allowed mobile stations to fully utilize the benefits of operating in some operating modes, such as the EGPRS-compliant mode. Specifically, the Radio Link Control (RLC) and the Medium Access Control (MAC) layers in EGPRS/GPRS systems use a sliding window protocol to track segmented blocks while in transit. To keep the window moving, acknowledgements must be frequently requested by the packet scheduler. These acknowledgements erode the uplink throughput, which is needed for uplink data transfers. Since the amount of delay is large between the scheduler and the mobile station, it is very costly whenever a data block is missed and retransmission is required. In the case of EGPRS-compliant mobile stations, these mobiles cannot gain all the benefits of incremental redundancy resulting in the inability to use high EGPRS coding schemes.

In other previous approaches, when an EGPRS-compliant mobile station in the downlink direction is multiplexed with a GPRS-compliant mobile station in the uplink direction, the EGPRS-compliant mobile station often transfers data blocks at a lower channel coding scheme even when Radio Frequency (RF) conditions would permit a higher channel coding scheme. Consequently, the higher coding schemes used by EGPRS-compliant mobile stations cannot be used.

In addition, EGPRS-compliant mobile stations require more memory than GPRS-compliant mobile stations in order to accommodate larger window sizes and support higher coding schemes. This requirement results in the multi-slot capacity of the EGPRS-compliant mobile stations being reduced as compared to the GPRS-compliant mobile stations. Consequently, the mobile stations operating in EGPRS mode transfer data at a lower bandwidth and lower coding scheme thereby reducing the throughput of data transferred.

Furthermore, when the packet scheduler in a EGPRS/GPRS network is separated from the mobile station by several network entities, the packet scheduler may be connected to other network entities via different types of links such as E1 cables. The bandwidth available over these E1 cables (backhaul bandwidth) may be reduced due to cost constraints with the operator. This causes limitations to the rate at which data is transferred to mobile stations.

All of these problems result in less than optimal performance for mobile stations when operating in modes such as EGPRS mode. Less system throughput, slower communications, and/or increased user frustration often results because of these shortcomings.

Figure 1:
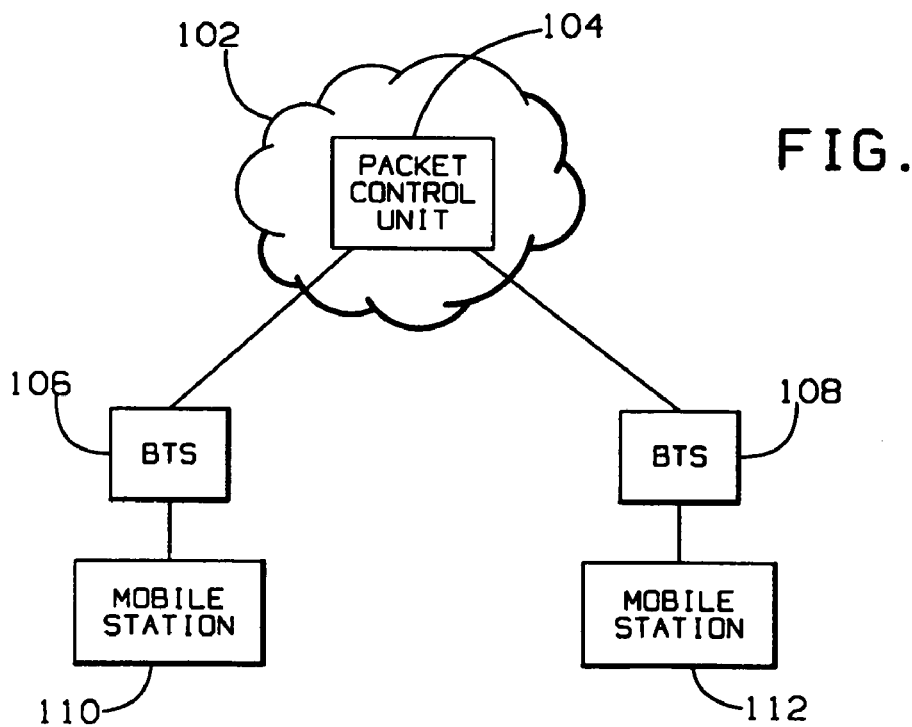
FIG. 1 is a block diagram of a system for switching modes of a mobile station according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method of operating a mobile station switches modes between an Enhanced General Packet Radio Service (EGPRS)-compliant mode of operation and a General Packet Radio Service (GPRS)-compliant mode of operation based upon the received operating parameters. In so doing, efficient operation of mobile stations in the network can be maintained regardless of the operating conditions experienced by the mobile stations. In addition, under appropriate conditions, the benefits of EGPRS-compliant coding schemes can be realized in order to transmit and retransmit data blocks in an efficient and cost effective manner.

In many of these embodiments, when operating a mobile station in an EGPRS-compliant mode of operation, a first performance of the mobile station in the EGPRS-compliant mode of operation is evaluated based upon received operating parameters. A second performance of the mobile station in a GPRS-compliant mode of operation is also determined based upon the received operating parameters. The EGPRS-compliant mode of the mobile station is switched to the GPRS-compliant mode of operation whenever the second performance is evaluated to be preferable to the first performance. In addition, the system may switch the mobile station back to the EGPRS-compliant mode of operation whenever at least one measured performance condition in the GPRS-compliant mode of operation significantly improves.

Evaluating the first performance and the second performance may include evaluating a variety of different conditions. For example, a block error rate for a data transfer and a frequency or regularity by which a block of data within the data transfer is lost and retransmitted may be evaluated. The number of retransmissions required to successfully transmit a data block is also considered. In another example, the time taken for a data block retransmission may be evaluated. In yet another example, the poll rate for at least one downlink acknowledgement message may be determined and evaluated.

The mobile stations may be operated in a number of different ways based upon the evaluation. For example, the mobile station may be operated at a first bandwidth in the GPRS-compliant mode of operation and at a second bandwidth in the EGPRS-compliant mode of operation. A first throughput may be determined in the GPRS-compliant mode of operation at the first bandwidth and a second throughput in the EGPRS-compliant mode of operation at the second bandwidth.

Thus, a system and method is described that provide for the switching of modes of mobile stations between EGPRS-compliant and GPRS-compliant modes of operation. The determination of whether to make the mode switch is based upon the operating conditions of the mobile station, available air resources, backhaul bandwidth, and mobile stations sharing the air resources in the uplink direction. Consequently, the efficient operation of the mobile station is maintained as the operating conditions of the mobile station change. Mobile stations can also realize the benefits of operating in EGPRS-compliant modes of operations such as being able to use higher coding rates.

Referring now to FIG. 1, one example of a system for switching modes of mobile stations is described. A network 102 includes a Packet Control Unit (PCU) 104 that performs scheduling functions for data transfers made within the network 102. The PCU 104 also determines when to switch the mode of a mobile station operating within the network 102. Alternatively, other network elements may be used to perform the scheduling and mode determination functions.

The network 102 may be any network or combination of networks such as a packet data network, a cellular network, or a Push-to-Talk (PTT) network. Other examples of networks are possible.

The network 102 is coupled to Base Transceiver Stations (BTSs) 106 and 108. The BTSs 106 and 108 provide functionality to provide communications between mobile stations 110 and 112. The mobile stations 110 and 112 operate in GPRS and EGPRS modes of operation. The mobile stations 110 and 112 may be any type of mobile wireless devices such as cellular telephones, pagers, personal digital assistants (PDAs), and personal computers. Other examples of mobile stations are possible.

In an example of the operation of the system of FIG. 1, when operating a mobile station in an EGPRS-compliant mode of operation, a first performance of the mobile station in the EGPRS-compliant mode of operation is evaluated based upon received operating parameters. A second performance of the mobile station in a GPRS-compliant mode of operation is also determined based upon the received operating parameters. The EGPRS-compliant mode of the mobile station is switched to the GPRS-compliant mode of operation whenever the second performance is evaluated to be preferable to the first performance. In addition, the system may switch the mobile station back to the EGPRS-compliant mode of operation whenever at least one measured performance condition in the GPRS-compliant mode of operation significantly improves.

Evaluating the first performance and the second performance may include evaluating a variety of different conditions. For example, a block error rate for a data transfer and a frequency by which a block of data within the data transfer is lost and retransmitted may be evaluated. In another example, the time taken for a data block retransmission may be evaluated. The number of retransmissions required to successfully transmit a data block is also considered. In yet another example, the poll rate for at least one downlink acknowledgement message may be determined and evaluated.

The mobile stations 110 and 112 may be operated in a number of different ways based upon the evaluation. For example, the mobile station 110 or 112 may be operated at a first bandwidth in the GPRS-compliant mode of operation and at a second bandwidth in the EGPRS-compliant mode of operation. A comparison may be made between a first throughput in the GPRS-compliant mode of operation at the first bandwidth and a second throughput in the EGPRS-compliant mode of operation at the second bandwidth.

In a more specific example of the operation of the system of FIG. 1, the network 102 continuously monitors the RF conditions of the mobile stations 110 and 112. The network 102 also monitors the current coding schemes (for both the uplink and downlink directions) that are being utilized. The network 102 additionally keeps track of the number of retransmissions needed to successfully transmit a radio data block at a current coding scheme. The network 102 compares the relative protection and possible block errors at a lower coding scheme and, after every evaluation, examines the frequency at which the data blocks are lost in the air and different approaches used to retransmit the data blocks. A comparison is made between the lower coding scheme with higher protection and higher bandwidth. For example, the multi-slot capacity of EGPRS mobile stations may be lower than the corresponding GPRS multi-slot capability.

If a lower coding scheme in GPRS-compliant mode is found to perform better with higher bandwidth, the network decides to switch the mobile station 110 or 112 from operating in the EGPRS-compliant mode to the GPRS-compliant mode. If the mobile station 110 or 112 is capable of using a multi-slot class for lower EGPRS-compliant coding schemes (e.g., MCS-4), the network 102 downgrades the coding scheme to MSC-4 or below and allocates higher bandwidth to the mobile station 110 or 112. The network 102 waits for the current data frame to be completely transmitted before switching from EGPRS-compliant mode to GPRS-compliant mode. This wait is undertaken to avoid losing any partially received data frame.

Figure 2:
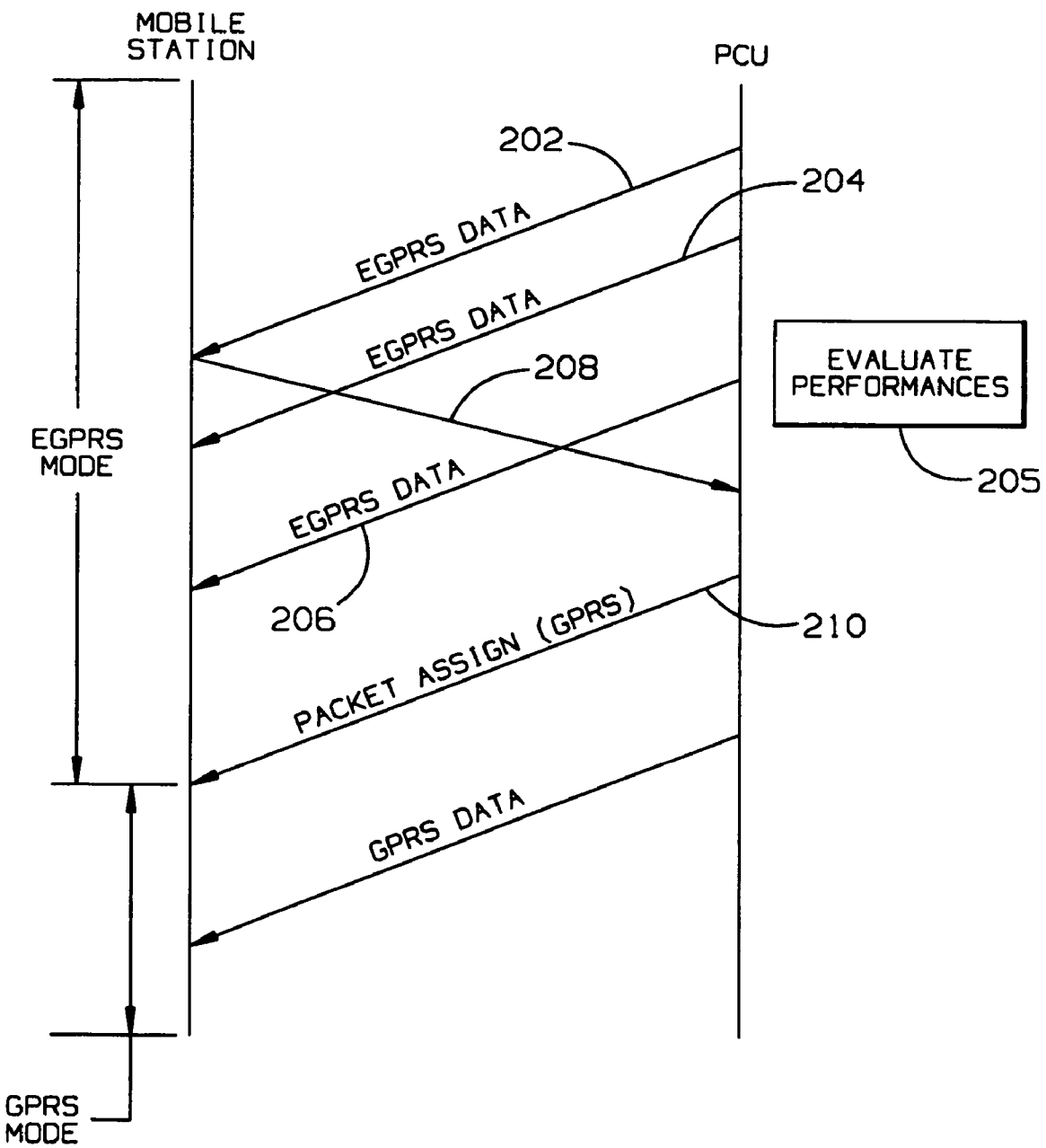
FIG. 2 is a call flow diagram of an approach for switching modes of a mobile station according to the present invention.

Referring now to FIG. 2, one example of an approach for switching the modes of operation of a mobile station is described. At steps 202, 204, and 206 the Packet Control Unit (PCU) transmits EGPRS data to the mobile station that is operating in the EGPRS-compliant mode of operation.

During the transmission of this data, the mobile station, at step 208, sends an acknowledgement to the PCU. At step 205, a first performance of the mobile station in EGPRS-compliant mode is evaluated based upon received operating parameters. A second performance of the mobile in GPRS-compliant mode of operation is also determined based upon the received operating parameters. A decision is made to switch the mode of the mobile station to the GPRS-compliant mode of operation whenever the second performance is evaluated to be preferable to the first performance.

The PCU receives the acknowledgment and sends a packet assignment message to the mobile station at step 210 informing the mobile station to switch to the GPRS mode of operation. At step 212, the PCU sends data to the mobile station in the GPRS mode of operation.

Figure 3:
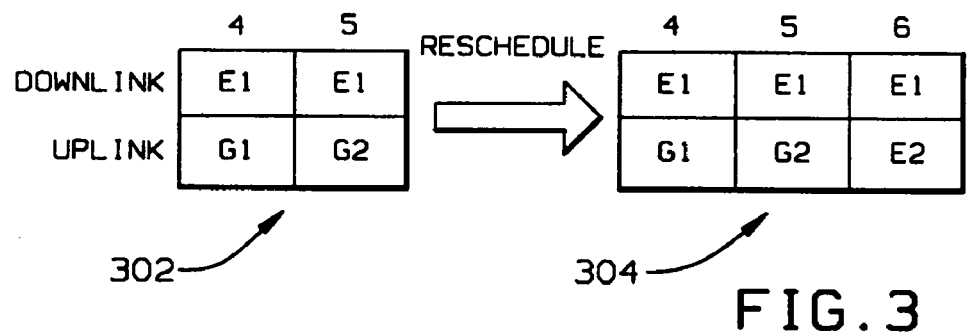
FIG. 3 is a block diagram of an approach for improving the throughput of mobile stations according to the present invention.

Referring now to FIG. 3, one example of an approach for improving the throughput of mobile stations is described. In this example, when a mobile station operating in EGPRS-compliant mode is multiplexed with a mobile station operating in GPRS-compliant mode in the uplink direction, the coding scheme of the EGPRS-compliant mobile station is downgraded in order to support the uplink data transfer of the GPRS mobile station.

As shown in table 302, the EPPRS mobile station (E1) is first multiplexed with the GPRS-compliant mobile stations G1 and G2. In timeslot 4, E1 uses the channel in the downlink direction and G1 in the uplink direction. In timeslot 5, E1 is in the downlink direction and G2 is in the uplink direction. A rescheduling occurs wherein the scheduler (e.g., at the PCU) recognizes that certain types of mobile stations require more time slots in order to achieve higher performance (since the coding scheme is restricted to MCS-4). In this case, another time slot is used to allocate the traffic as shown in table 304. In timeslot 4, E1 uses the channel in the downlink direction and G1 in the uplink direction. In timeslot 5, E1 is in the downlink direction and G2 is in the uplink direction. In timeslot 6, E1 is in the downlink direction and another mobile station (E2) is in the uplink direction.

Figure 4:
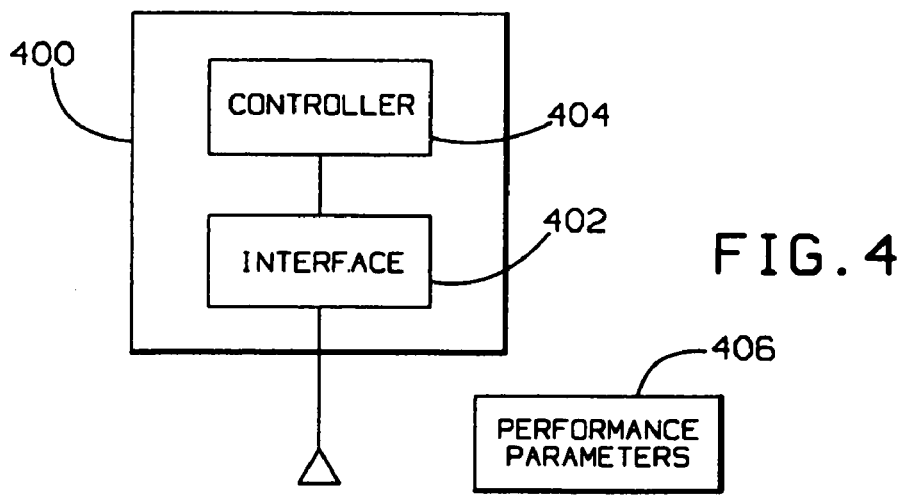
FIG. 4 is a block diagram of a device for switching modes of a mobile station according to the present invention.

Referring now to FIG. 4, a mobile station that switches between different modes of operation includes an interface 402 and a controller 404. The interface 402 receives performance parameters 406. These performance parameters 406 may include the throughput achieved by data being transmitted in the system.

The controller 404 is programmed, using the performance parameters 406, to evaluate a first performance of the mobile station in an Enhanced General Packet Radio Service (EGPRS)-compliant mode and a second performance of the mobile station in a General Packet Radio Service (GPRS)-compliant mode. The controller 404 is further programmed to switch the EGPRS-compliant mode of the mobile station to the GPRS-compliant mode whenever the second performance is higher than the first performance.

In another example, for mobile stations operating in cells with UMTS neighbors, the controller facilitates switchovers without outages and retransmissions. The controller continuously monitors the distance of the mobile station from the base station. The controller takes into account the operating conditions and computes a first performance of the mobile station in the EGPRS-compliant mode and a second performance in the GPRS-compliant mode and a potential performance in a UMTS-compliant mode. The controller determines to switch the mobile station to the UMTS earlier than the mobile station would have decided (by itself) to move. Once the determination is made to switch the mode of the mobile station to the UMTS-compliant mode, the controller informs other programming layers to halt transmitting downlink data to the mobile station. After having transmitted all the downlink data blocks in the EGPRS/GPRS network, the controller moves the mobile station to the UMTS network. This approach can be applied when a mobile station is moved from the UMTS network to the EGPRS network. By using this approach, data outages and retransmissions are avoided in the witch over.

Thus, a system and method is described that provide for the switching of modes of mobile stations between EGPRS-compliant and GPRS-compliant modes of operation. The determination of whether to make the mode switch is based upon the operating conditions of the mobile station. Consequently, the efficient operation of the mobile station is maintained as the operating conditions of the mobile station change.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention. For example, it may be useful in some application settings to require a certain number of affirmative tests to be accumulated before making the decision to switch from the EGPRS-compliant mode of operation to the GPRS-compliant mode of operation and from the EGPRS-compliant mode of operation to the UTMS-compliant mode of operation (and vice versa).

What is claimed is:

1. A method of operating a mobile station in a network comprising:

when operating a mobile station in an Enhanced General Packet Radio Service (EGPRS)-compliant mode of operation:

the mobile station evaluating a first performance of the mobile station in the EGPRS-compliant mode of operation based upon received operating parameters and a second performance of the mobile station in a General Packet Radio Service (GPRS)-compliant mode of operation based upon the received operating parameters; and switching the EGPRS-compliant mode of the mobile station to the GPRS-compliant mode of operation whenever the second performance is evaluated to be preferable to the first performance.

2. The method of claim 1 wherein evaluating the first performance and the second performance comprises monitoring a block error rate for a data transfer and a frequency by which a block of data within the data transfer is lost and retransmitted and a number of retransmissions required to successfully transmit the data block.

3. The method of claim 1 wherein evaluating the first performance and the second performance comprises recording a time taken for a data block retransmission, the backhaul bandwidth available for data transmission, and the air bandwidth available for data transmission.

4. The method of claim 1 wherein evaluating the first performance and the second performance comprises determining a poll rate for at least one downlink acknowledgement message.

5. The method of claim 1 wherein evaluating the first performance and the second performance comprises operating the mobile station at a first bandwidth in the GPRS-compliant mode of operation and at a second bandwidth in the EGPRS-compliant mode of operation and determining when a first throughput in the GPRS-compliant mode of operation at the first bandwidth is greater than a second throughput in the EGPRS-compliant mode of operation at the second bandwidth.

6. The method of claim 1 further comprising switching back to the EGPRS-compliant mode of operation whenever at least one measured performance condition in the GPRS-compliant mode of operation significantly improves.

7. The method of claim 1 further comprising determining a third performance of the mobile station in a Universal Mobile Telecommunication Service (UMTS)-compliant mode of operation.

8. The method of claim 7 further comprising switching the mobile station to a UMTS network earlier than the mobile station would have otherwise determined to move.

9. A mobile station in a network, the mobile station comprising:
an interface for receiving performance parameters; and
a controller coupled to the interface, and programmed, using the performance parameters, to evaluate a first performance of the mobile station in an Enhanced General Packet Radio Service (EGPRS)-compliant mode and a second performance of the mobile station in a General Packet Radio Service (GPRS)-compliant mode, the controller further programmed to switch the EGPRS-compliant mode of the mobile station to the GPRS-compliant mode whenever the second performance is higher than the first performance.

10. The mobile station of claim 9 wherein the performance parameters are selected from a group comprising: a block error rate for data transfers; a frequency by which blocks are lost and retransmitted; a time taken for data block retransmission; and a poll rate for a downlink acknowledgement message.

11. The mobile station of claim 9 wherein the controller is programmed to operate the mobile station at a first bandwidth in the GPRS-compliant mode of operation and at a second bandwidth in the EGPRS-compliant mode of operation and to determine when a first throughput in the GPRS-compliant mode of operation at the first bandwidth is greater than a second throughput in the EGPRS-compliant mode of operation at the second bandwidth.

12. The mobile station of claim 9 wherein the controller is programmed to switch back to the EGPRS-compliant mode whenever at least one of the performance parameters significantly improves.

13. The mobile station of claim 9 wherein the controller is further programmed to determine to switch to a Universal Mobile Telecommunication Service (UMTS)-compliant mode of operation and stop transmitting all downlink data for the mobile station after the determination to switch to the UMTS-compliant mode of operation has been made.

14. The mobile station of claim 13 wherein the controller is further programmed to move the mobile station to a UMTS network after all the downlink data has been transmitted.

* * * * *